Jan. 2, 1945.  C. W. KELSEY  2,366,625
TINE
Filed May 25, 1943
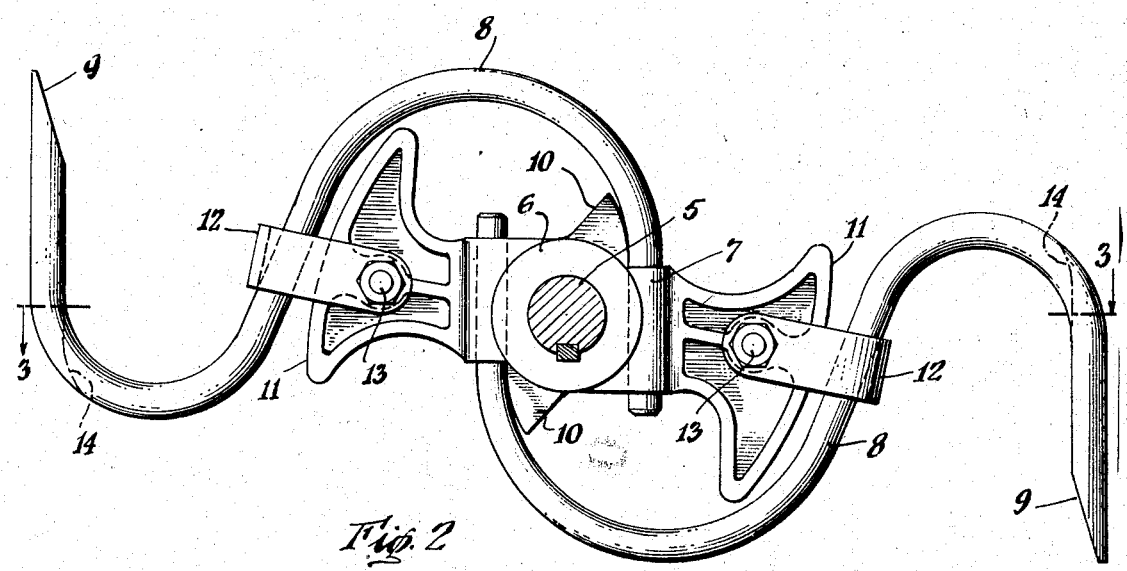
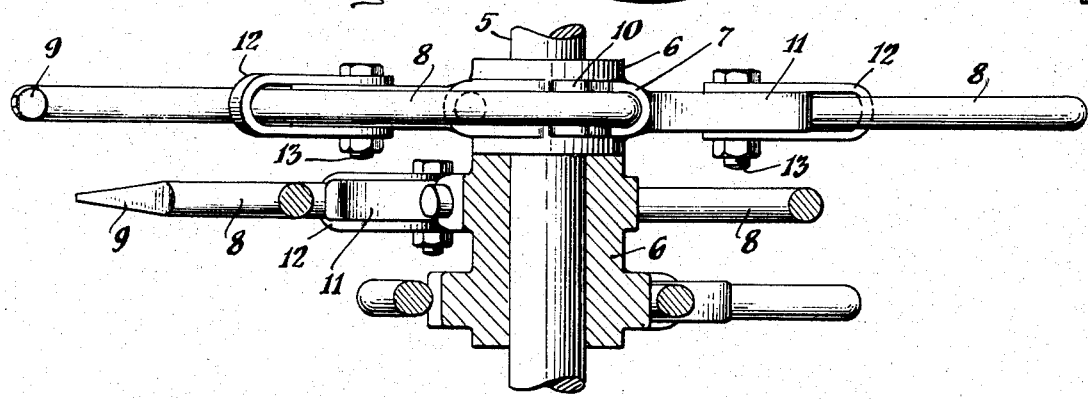
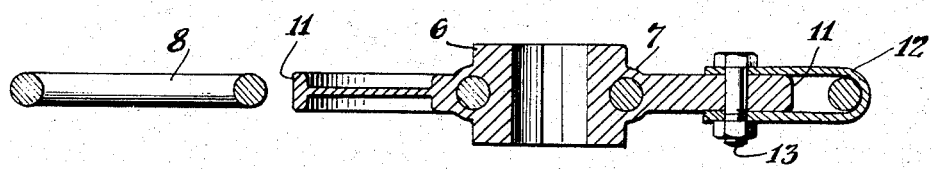
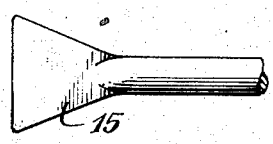
INVENTOR.
Cadwallader W. Kelsey
BY
ATTORNEYS Patented Jan. 2, 1945

2,366,625

UNITED STATES PATENT OFFICE 2,366,625

TINE

Cadwallader W. Kelsey, Troy, N. Y., assignor to Rototiller, Inc., Troy, N. Y., a corporation of Delaware Application May 25, 1943, Serial No. 488,353

4 Claims. (Cl. 97—216)

This invention relates to a tine and supporting structure therefor and aims to provide a mechanically and functionally improved unit of this nature for application to an agricultural machine.

In tillage machines, particularly those of the rotary type, the cutting tools or tines as they are called in practice, are subject to severe shock and excessive abrasion. Wear and breakage occur continually, the breakage most generally being confined to stony conditions or ground that contains foreign obstacles or in itself is very difficult to till, such as baked clay or gumbo. Because of this, it is necessary to change the tines or the spring on which the tine is mounted or both at frequent intervals when conditions are severe. This means a loss of time and considerable expense for new parts. Furthermore, it is desirable to have tines placed closely together so that each tine has a minimum amount of work to do.

As each tine hits the ground, it takes a certain size bite. This bite can be of any depth of cut the machine is designed for. According to the axial and circumferential spacing of the tines or other ground-working tools, the resistance is increased or decreased as the machine moves forward over the ground. Also, the thoroughness with which the ground is worked varies according to the spacing of the tines or their equivalents. The desirability, therefore, of having the tines mounted in such a manner that more than one tine can be in the same plane is of the utmost importance.

In this invention, it is possible to cut the bite in two and at the same time have the tines so closely spaced to each other that an additional advantage is secured because the width of the material that is to be removed is reduced to the minimum. For instance, if the tines were separated 6" apart and the bite were 6" deep, then each tine would be required to remove material from an area 6" deep and 6" wide. This invention permits the tines to be brought very closely together so that the amount of work each tine does can be reduced to a point of minimum width of cut.

Any tine mounting where two legs are used for mounting or where coil springs are used for mounting increases the width of spacing, lessens the efficiency of the whole cutting unit in that each tine must do more work. This means added abrasion and greater breakage.

A design that requires two legs for anchorage or a distance wider than the tine itself, means a lesser number of tines to do the work. Consequently, more work per tine. It is also important, in order to create good pulverization, that the tine be resiliently mounted with resilience sideways as well as in the diretcion of rotation.

Thus, it is an object of the invention to provide a tine mounting and tine such that the ground-engaging or working portion of the latter and the parts adjacent thereto may move to some extent to the right or left of the normal plane of action of the tine. This increases the width and desirability of the cut or work area.

A further object of the invention is that of providing a tine mounting in which the tine preferably comprises a single unit and in which, consequently, costs of construction are reduced to a minimum. Moreover, the tine may readily be mounted and dismounted with minimum effort and in a minimum amount of time and without the necessity of employing any locking bolts or equivalent securing means.

A still further object of the invention is that of providing a tine structure which will be adequately braced and in which such bracing will be increased proportionally to the amount of support required. This will depend upon the ground resistance offered to the tine. Moreover, such support will be entirely adequate whether the tine-mounting shaft is being rotated in a clockwise or counter-clockwise direction.

An additional object is that of furnishing a unit of this type which will operate in a satisfactory manner whether deep or shallow tillage is being resorted to. Additionally, in achieving the foregoing objects, the present unit will possess the advantage of deflecting or tending to wrap around the driving and supporting shaft to a degree proportionate to the resistance encountered by the tine.

Another object is that of furnishing a unit and mechanism of this nature, both of which will embody a simple and rugged construction including a few parts capable of ready and economical manufacture.

With the foregoing in mind, reference is had to the attached sheet of drawings illustrating one practical embodiment of the invention, and in which:

Fig. 1 is a side view of a mounting and driving shaft and having in association therewith a pair of tines as well as the supporting structure therefor;

Fig. 2 is a partly sectional face view of the unit;

Fig. 3 is a transverse sectional view taken along the lines 3—3 and in the direction of the arrows as indicated in Fig. 1; and Fig. 4 shows the tip of an alternative form of tine which may be employed in lieu of that illustrated in the preceding figures.

In these views, the reference numeral 5 indicates the driving and mounting shaft which supports a series of collars or hubs 6. The latter present, at diametrically opposite points, socket portions 7 formed with bores to receive the inner ends of the tines 8. These, as illustrated, are of generally S-shape and may have their outer ends reduced as indicated at 9 to provide a ground-engaging and working portion. These tines are preferably formed of a metal such that they will embody a certain amount of resiliency but at the same time be capable of having their bodies worked to assume their initial configuration should these bodies become bent. Such bending may occur when the tine engages an obstruction, such as a rock or large stone.

As illustrated, the collars are secured against rotation with respect to the shaft by key-ways. Obviously, any number of the latter, as well as keys, may be provided or these portions may be secured in any other suitable manner to the shaft. It will also be noted that, according to the preferred construction, the base of the tine extends not only into the bore of the socket portion 7 but actually beyond the same. This is of particular value when it is desired to dismount the tine, in that the base may be engaged by a hammer or other suitable implement to drive the same out of the socket.

If the shaft as viewed in Fig. 1 is turning in a clockwise direction, it is apparent that—according to the amount of resistance encountered by the tine—the latter will tend to "wrap" around the shaft. The structure of the present invention permits of this desirable result. At the same time, it will be apparent that there should be embodied in the mechanism a construction such that this function will be controlled. In other words while, under certain circumstances, the radius of operation of the tine should, for the moment, be reduced, such reduction should not be beyond a minimum point.

To achieve this result and having in mind that a pair of tines are associated with each hub portion, the latter is formed with tine-supporting projections or ears 10. The surfaces of these projections adjacent the tine should preferably be curved to conform to the degree of curvature of the tine at points adjacent and immediately beyond the sockets 7. Thus, the tines are braced at this point and lie in immediate proximity or only slightly spaced from the adjacent surfaces of the ears or projections 10. The bracing effect is obvious in that, if a strain is exerted on the tine, it will tend to "wrap" around the shaft and consequently will intimately engage the adjacent surface of the projection 10 extending to one side of the same. Under these circumstances, the entire tine, to a plane or line coextensive with the end of the particular projection 10, will be braced and supported by that element. Consequently, a movement-limiting structure is furnished at these points.

As especially shown in Fig. 1, further supporting elements are provided by furnishing arcuate shoe or contact portions 11 at points spaced to a material extent from the projections 10. The parts 11 may be formed in the outer edges of extensions which are integral with the hub and sockets 7. The degree of curvature of these latter elements is preferably more acuate than the adjacent tine portion which is spaced therefrom. Accordingly, and under conditions such as illustrated in Fig. 1, a space of increasingly greater cross-sectional area is furnished between the surface of the arcuate shoe and the adjacent edge of the tine. Therefore, the body of the tine—upon encountering resistance to movement—will primarily engage the arcuate surface 11 at a point adjacent the leading edge of the latter. If the resistance be increasing or material, then the tine will come into increasingly intimate contact with an increasing length of the arcuate surface.

Consequently, a support of a value which increases automatically in proportion to the resistance encountered by the tine is furnished. If the resistance to movement be sufficient, the tine would engage the arcuate surface throughout substantially the entire length of the latter. The trailing edge of the bracing element will, in fact, serve as a fulcrum or bending support for the tine should the latter encounter some substantially immovable object. Consequently, the tine will bend or straighten out through a zone where it may be readily manipulated by a subsequent operation to enable the user to cause it to assume its initial shape. Such a reforming operation may be resorted to a number of times during the life of the tine. However, it will be apparent that, since the surface 11 of the tine-bracing element conforms approximately in contour and extent to that portion of the tine which is common to both loops of the S, and is disposed in but slightly spaced relation thereto, the stresses in that loop of the S which is adjacent the socket, and including that portion of the tine which is common to both loops, will be limited substantially to tensile stresses with little or no bending after the tine once engages the full length of the surface 11. Thus, danger of breakage and bending of this major portion of the tine is substantially eliminated, and such bending as may take place will be confined exclusively to that portion only of that tine loop which is between the free end thereof and the adjacent end of the surface 11.

A member serving primarily the function of a rebound check may be furnished by associating with each tine a U-shaped strap 12. This strap has its legs straddling the tine and conveniently extending to both sides of the member furnishing the arcuate surface 11. At this point, it may be secured in position by a bolt 13 which will allow a certain amount of rocking movement on the part of this checking element. Normally, the latter will prevent the tine from expanding beyond the point shown in Fig. 1. At that point, the tine should be either under a slight amount of tension or else in its normal expanded condition. When the tine has been in contact with the surface 11 as a consequence of resistance to movement and is then freed from that resistance, its movements will obviously be controlled by the check element 12. It will be understood, however, that this element serves the additional function that, if the tine as viewed in Fig. 1 be rotated in a counter-clockwise direction (which is extremely desirable when certain specific operations are to be performed) the strap 12 or its equivalent will act as a brace for the tine preventing the working point or end of the latter from traversing too great an arc or, in other words, prohibiting the tine body from being placed under a strain such that it might be permanently distorted.

It is also to be observed that the legs of the strap 12 preferably allow of a certain amount of space between their inner surfaces and the adjacent surfaces of the tine. This will allow the body of the latter to have a certain amount of sidewise movement at this point. Of course, adjacent the tips or outer ends of the tines greater sidewise movement is permissible. However, such movement will aways be controlled when a structure in accordance with the teachings of the present invention is provided.

In practice, a number of the hubs are suitably associated with the shaft. In so mounting these elements, care must be exercised to be certain that the different sets of tines project along different planes or radii. This may obviously be accomplished in numerous different manners. As will be apparent, at least a pair of tines may, under the present construction, operate in the same plane. This is achieved without duplication of weight or expense; the additional factor being largely the second tine which is employed to provide a pair. Consequently, a maximum number of tines may be distributed along a shaft and the machine operation may provide for a much smaller bite and consequently finer pulverizing mixing effect. Also, the inertia is reduced as a consequence of the reduction in weight and the flywheel effect is minimized so that breakage will, accordingly, be reduced.

It is to be particularly observed that, as a consequence of the spacing of the tine-supporting surfaces provided by the projections 10 and the arcuate shoes 11, there will be no danger of material becoming packed in the tine. Such packing would, of course, serve to artificially and improperly "back" the tine. It follows that, under such conditions, the latter could not yield upon resistance being encountered. Rather, with the spacing between the supporting elements, any material will be immediately disposed of without lodging against and adhering to the parts. As indicated by the reference numeral 14, a tine under ordinary circumstances may be used until it has worn down to the zone indicated and as a consequence of abrasion with the earth or material which is being worked upon. Only then will it be necessary to mount a new point on the tine or to replace the latter entirely. During such wearing down, the operating end of the tine will always remain effective and sharp.

In conclusion, it will be observed that the tine body and ends may be modified in numerous respects. As shown in Fig. 4, a flared end portion 15 may engage and work ground. Also, as indicated in Fig. 2, it will be noted that the hub may be what one might term a twin unit or a single unit. In the former case, it will, for example, mount four tines circumferentially displaced with respect to each other. In the latter case, merely a pair of tines may be mounted by the hub unit. Especially in the case of the twin unit, the distance between adjacent tines may be even further minimized to assure a maximum working of the ground while at the same time permitting sidewise springing or displacement of the tools. Additionally, the hub of this unit assures adequate key-engagement and strength. Moreover, an operator, in mounting elements of that nature, will, without conscious effort, distribute adjacent pairs of tines along the shaft and at angles displaced 45° from each other. Consequently, the circumference of the shaft throughout its entire length will present properly distributed tines; this being feasible by employing, for example, only two key-ways.

Thus, among others, the several objects of the invention, as specifically afore noted, are achieved. Obviously, numerous changes in construction and rearrangements of the parts might be resorted to without departing from the spirit of the invention as defined by the claims.

I claim:

1. A tine assembly adapted for use on a rotary soil tiller and comprising a hub adapted to be secured to a shaft and having two, diametrically-disposed, tine-receiving sockets thereon positioned closely adjacent the exterior surface thereof; resilient tines having one end of each thereof free and the other end withdrawably positioned in one of said sockets with the portion adjacent said socket curving approximately half way around said hub but in increasingly spaced relation thereto from said socket; a tine-bracing element for each of said tines having an arcuate, tine-contacting face of substantial length but substantially spaced from the socket in which the tine associated therewith is secured and so constructed, arranged and closely disposed with respect to said associated tine that pressure on the free end of said tine, when in operation, will progressively force said tine against the face of said bracing element without creating material bending stress in said curved portion of said tine; and means detachably secured to said hub for limiting the extent to which each of said tines may move away from the face of its associated bracing element; whereby, in operation the stress in said curved portions of the tines will be confined substantially to tensile stress.

2. The structure set forth in claim 1 together with a tine-bracing projection on said hub immediately adjacent each of said sockets and having a short, arcuate, tine-engaging surface substantially tangent to the adjacent tine at the point where said tine emerges from its socket.

3. A tine assembly adapted for use on a rotary soil tiller and comprising a hub adapted to be secured to a shaft and having two, diametrically-disposed, tine-embracing sockets therein, resilient, S-shaped tines each having one end thereof withdrawably positioned in one of said sockets with the adjacent loop of the S extending around said hub in increasingly spaced relation thereto from said socket, tine-bracing elements on said hub each having a face conforming approximately in extent and positioned to cooperate with that portion of one of said tines which is common to both loops of the S and disposed between said tine and said hub, and means detachably secured to said hub for limiting the distance which said tine may move away from its associated tine-bracing element; whereby, in operation, pressure on the ends of said tines remote from their sockets will initially flex said tines into contact with the faces of their respective bracing elements and thereafter, the stresses in the loops of said tines adjacent said hub and in the portions thereof common to both loops will be limited substantially to tension.

4. The structure set forth in claim 3 together with a tine-bracing projection on said hub adjacent each of said sockets having a short, arcuate, tine-engaging face substantially tangent to the adjacent tine where it emerges from its socket.

CADWALLADER W. KELSEY.